United States Patent [19]
Bahrton

[11] 3,802,283
[45] Apr. 9, 1974

[54] DEVICE FOR MEASURING THE VELOCITY OF A FLOWING OR STREAMING MEDIA

[76] Inventor: Per Svante Bahrton, Olandsgatan 45B, 116 63 Stockholm, Sweden

[22] Filed: Dec. 20, 1971

[21] Appl. No.: 209,871

[30] Foreign Application Priority Data
Dec. 22, 1970 Sweden.......................... 17416/70

[52] U.S. Cl. .............................. 73/194 B, 137/826
[51] Int. Cl. ............................................ G01f 1/00
[58] Field of Search ....... 73/194 R, 194 B; 137/81.5

[56] References Cited
UNITED STATES PATENTS

| | | | |
|---|---|---|---|
| 3,273,377 | 9/1966 | Testerman | 73/23.1 |
| 3,442,124 | 5/1969 | Warren et al. | 73/194 |
| 3,016,066 | 1/1962 | Warren | 137/81.5 |
| 3,238,960 | 3/1966 | Hatch, Jr. | 73/205 X |
| 3,640,133 | 2/1972 | Adams | 73/194 |
| 3,556,409 | 1/1971 | Johannisson | 137/81.5 |
| 3,690,171 | 9/1972 | Tippetts | 73/194 |

*Primary Examiner*—Herbert Goldstein
*Attorney, Agent, or Firm*—Eric Y. Munson

[57] ABSTRACT

This invention relates to a device for measuring the rate of flow of a media using a fluidistor having two control chambers, which are connected to eachother by a tube member. This fluidistor is then working as an oscillator, and the construction of the fluidistor gives a frequency directly proportional to the rate of flow.

6 Claims, 1 Drawing Figure

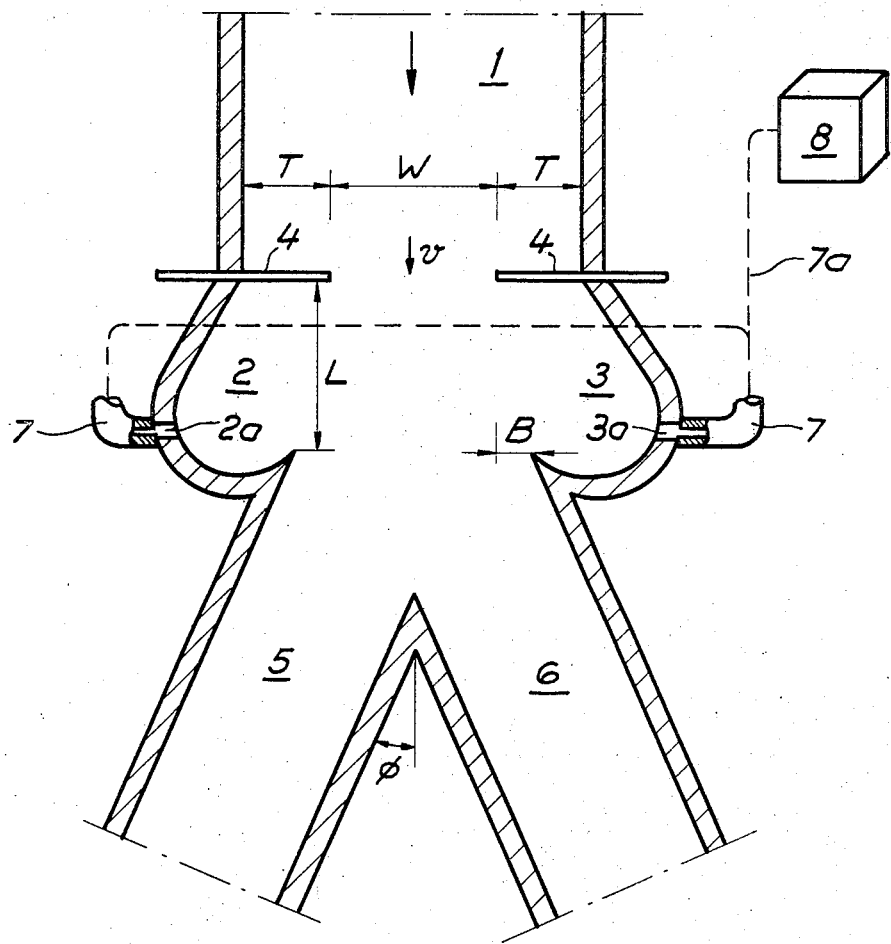

DEVICE FOR MEASURING THE VELOCITY OF A FLOWING OR STREAMING MEDIA

FORGROUND OF THE INVENTION

This invention relates to a device for measuring the rate of flow of a medium. The invention makes use of a fludistor with two control chambers.

BACKGROUND OF THE INVENTION

A number of different devices have been known previously for measuring the rate of flow of a medium, and most of the previously known devices are based on the principle of placing a rotatable wheel into the medium and sensing the rotation of the wheel, which reading when converted gives the rate of flow. It is obvious that devices of this nature are not only expensive to make but also require continuous maintenance.

A device has also been proposed for measuring the rate of flow of a medium which makes use of an orifice plate placed into the pipe, the difference in pressure on either side of the orifice being detected. Such a device uses no moving parts in the pipe but has on the other hand the drawback that the pressure difference is not a linear function of the rate of flow, and considerable effort must therefore be made to achieve correct calibration.

SUMMARY OF THE INVENTION

This invention describes a means of measuring the rate of flow of a medium by utilising a fluidistor with two control chambers.

The invention is based on the knowledge that in the case where the two guide ducts in the control chambers are interconnected by a tube or similar passage, the medium passing through the fluidistor will be switched by the jet effect of the main stream alternately through one or the other control chamber. It has further been found that in the case where an incompressible medium is used the switching frequency will be directly proportional to the rate of flow over a very wide range.

DESCRIPTION OF THE INVENTION

A constructional version proposed at present which exhibits the significant characteristics of this invention will be described below in detail by reference to the attached drawing which shows a section of a suitable fluidistor as well as an attached recording unit.

The attached drawing thus shows a device for measuring the rate of flow of a medium which enters the inlet port 1 of a fluidistor having two control chambers 2 and 3. Between the inlet port 1 and the control chambers 2 and 3 there is an orifice plate 4 of very small longitudinal extent in the direction of flow of the medium. The fluidistor exhibits two exit ports 5 and 6 and the medium is designed to pass through one of these depending on the pressure in control chamber or vortex chamber 2 or 3 respectively. This will be demonstrated and described in greater detail in connection with the description of the method of operation. The control chamber 2 has a control duct 2a and the control chamber 3 a control duct 3a. The control duct 2a and 3a may also be designated guide ducts since it is their function to steer the medium to either exit port 5 or 6. The two control ducts or guide ducts are however connected to one another by means of a tube 7 which is shown in the attached drawing. The tube 7 is joined to a further tube 7a which leads to a recording unit 8. The recording unit 8 is designed to sense the pulsation frequency of the medium and to evaluate the velocity $v$ of the medium as a function of this pulsation frequency.

As regards the recording unit 8, this may be constructed in several ways which is however outside the scope of this invention. It should be mentioned however that, instead of using the additional tube 7a, it is possible to sense the variations in pressure in tube 7 directly, either mechanically or electrically and to transmit this electrically to the recording unit 8. It is also possible to connect the recording unit 8 to one of the exit ports 5 or 6 or to any other place in the fluidistor where there are variations in pressure depending on or connected with the pulsation frequency of the medium.

The recording unit 8 may also contain devices for multiplying the rate of flow reading by the cross sectional area of the duct in order to provide in this way a reading for the flow.

In metering with a device in accordance with this invention, it is best to carry out measurements within a range of rates of flow of the medium such that the rate of flow of the medium is directly proportional to the switching frequency. In cases where an incompressible medium such as a liquid is made use of, the lower limit of this range is just above the lowest rate of flow at which there is a fluidistor effect. The upper limit is probably so high that the mass forces acting on the medium are so large that the medium cannot be controlled by the fluidistor. In the case where a compressible medium is to be metered, it might be necessary to introduce correction factors in the recording unit 8, and where recording is carried out electrically, such correction will be easy to introduce. The only reason why such a correction factor is introduced is to ensure that the output signal of the recording unit 8 will be linear in relation to the rate of flow.

The configuration of the fluidistor is not critical as regards this invention, and its constructional configuration may be selected depending on the range of application and the medium being used. The attached drawing shows a fluidistor in which the ratio L/W is approximately unity, but this ratio could just as easily be varied between 0.8 and 5. As regards ratio B/L, the value proposed here to approx. 0.2, but this ratio also could be varied, preferably within the range 0.05 – 1.0. As regards the ratio T/W, the constructional example shows a value of approx. 0.5, but this value also could be varied, preferably within the range 0.1 – 1.0. In the latter case a value greater than 1.0 could also be employed. As regards the angle $\phi$, a serviceable unit will be obtained if this value varies between 10° and 45°. It should be borne in mind with regard to the above ranges that a fluidistor should not be selected in which the values of the ratios are either all at the low limit or all at the high limit, but as mentioned above the values must be adapted to the conditions in which the fluidistor is to be used.

The device shown works as follows. If it is assumed that a medium enters the inlet port 1, then in the first instant it will flow straight through the fluidistor, half the flow passing out through exit port 5 and the other half through exit port 6. This is however an unstable condition, and the jet effect of the main stream on the surrounding medium downstream of the orifice plate 4 will immediately initiate the formation of a vacuum in chamber 3, with the result that the main stream will switch over to exit port 6. During the period of time that the direction of the main stream is changed from the central position to the exit port 6, the vacuum in chamber 3 gradually increases and is greatest when the curvature of the main stream is the greatest. Since the vacuum is greater in chamber 3 than in chamber 2, a control flow passes from chamber 2 to chamber 3 and extinguishes the vacuum so that the main stream switches over to the other exit port, and so on. The geometry of the fluidistor must be such that there is a phase displacement between the change in direction of the main stream and the change in direction in the tube connecting the control chambers, i.e., there must be time for the main stream to switch from exit port 6 to exit port 5 before the flow in the connection tube can change direction, which is the case owing to the mass inertia forces acting on the medium in the connecting tube. There is thus a pulsation in the medium, the pulsation frequency, according to the description above, being proportional or substantially proportional to the rate of flow.

The device described and proposed above can be used to advantage in all fields where it is desired to meter the rate of flow of a medium, and in cases where the recording unit is constructed so as to indicate the velocity in knots, the device can easily be used for measuring the speed of a boat. In practical use of the subject matter of the invention, it is best to join together the two exit ducts of the fluidistor downstream of the chambers 2 and 3 so that measurement of speed or rate of flow can be effected in any pipe line.

Natually, the invention is not confined to the constructional version specified above as an example but can be modified within the framework of the subsequent patent claims. Tube 7 may contain two diaphragms placed at a distance from one another in such a way that they enclose a space separatd from the medium. A permanent magnet can be placed in this space so as to actuate a Reed contact arranged adjacent said space. A hot-wire anemometer can also be connected into tube 7 in order to sense the pulsation.

I claim:

1. A device for the measurement of the quantity per unit time of a medium flowing through a bistable fluidic device from an inlet port to a pair of exit ports, the device comprising two control chambers, each of which is adjacent to its exit direction, the control chambers being connected with one another to form an oscillator whose frequency is proportional to the flow per unit time even within a flow range immediately above the lowest flow range in which there is a fluidic effect, a recording unit to sense the oscillator frequency and convert this into flow per unit time, an orifice plate located between the inlet port and the control chamber, the orifice plate having slight thickness in the direction of the main stream of the medium relative to its extension at right angles to the said direction of flow and in the plane at which change in the direction of flow takes place; the side surfaces of the orifice plate situated upstream forming an angle, substantially 90°, with the direction of flow of the main stream of the medium at the inlet port and with the axis of said inlet port.

2. A device according to claim 1, in which the ratio of the distance between the orifice plate and the edge of the control member facing toward the orifice plate, to the distance between the edges of the orifice plate which define the orifice, is situated within the range 0.8–5.

3. A device according to claim 1, wherein the ratio of the distance by which the edges of the orifice plate which define the orifice project into the duct beyond the surface or point of the control chamber facing toward the orifice plate, to the distance between the orifice plate and the surface of the control chamber which faces toward the orifice plate, is situated within the range 0.05–1.0.

4. A device according to claim 1, in which the ratio of the distance between the inside of the duct and the edges of the orifice plate which define the orifice, to the distance between the edges of the orifice plate which define the orifice, is situated within the range 0.1–1 or is somewhat in excess of unity.

5. A device according to claim 1, wherein the exit ports form an angle within the range 10°–45° to the direction of the main stream in the inlet port.

6. A device in accordance with claim 1, wherein the recording unit is connected to one of the exit ports.

* * * * *